(12) United States Patent
Brady et al.

(10) Patent No.: US 11,204,989 B2
(45) Date of Patent: Dec. 21, 2021

(54) PASSTHOUGHT FOR MULTIFACTOR AUTHENTICATION IN AUGMENTED REALITY

(71) Applicant: International Business Machines Corporation, Armonk, NY (US)

(72) Inventors: Simon J. Brady, Dublin (IE); Barry Hollywood, Navan (IE); Clea A. Zolotow, Key West, FL (US); John V. Delaney, Kildalkey (IE)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 15/965,352

(22) Filed: Apr. 27, 2018

(65) Prior Publication Data

US 2019/0332751 A1    Oct. 31, 2019

(51) Int. Cl.
| | |
|---|---|
| *H04L 29/06* | (2006.01) |
| *G06F 21/32* | (2013.01) |
| *G06T 19/00* | (2011.01) |
| *G06K 9/62* | (2006.01) |
| *G06F 21/36* | (2013.01) |
| *G06F 3/01* | (2006.01) |
| *G06F 21/40* | (2013.01) |

(52) U.S. Cl.
CPC ............ *G06F 21/32* (2013.01); *G06F 3/015* (2013.01); *G06F 21/36* (2013.01); *G06F 21/40* (2013.01); *G06K 9/6215* (2013.01); *G06T 19/006* (2013.01)

(58) Field of Classification Search
CPC ....... H04L 9/0866; H04L 9/32; H04L 9/3213; H04L 9/3231; H04L 29/06809; H04L 63/0861; G06F 21/32; G06F 21/36; G06F 21/40; G06F 3/015; G06K 9/6215; G06T 19/006

See application file for complete search history.

(56) References Cited

U.S. PATENT DOCUMENTS

| | | | | |
|---|---|---|---|---|
| 9,432,361 | B2 * | 8/2016 | Mahaffey | ............... H04L 63/18 |
| 9,672,760 | B1 * | 6/2017 | Breuer | .................. H04L 9/3247 |
| 10,318,833 | B2 * | 6/2019 | Agarwal | .............. A61B 5/7239 |
| 10,706,134 | B2 * | 7/2020 | Furman | .................. G06F 21/34 |

(Continued)

FOREIGN PATENT DOCUMENTS

AU        2015203773 A1      1/2016

OTHER PUBLICATIONS

Nick Merrill et al., Is the Future of Authenticity All in Our Heads? Oct. 2017, ACM, pp. 70-79. (Year: 2017).*

(Continued)

*Primary Examiner* — Luu T Pham
*Assistant Examiner* — Fahimeh Mohammadi
(74) *Attorney, Agent, or Firm* — Kelsey M. Skodje

(57) ABSTRACT

A system and method for multifactor authentication. The method includes receiving a passthought brainprint and a training 3D pattern. The method also includes calculating a variance between the training 3D pattern and a passthought 3D pattern, and generating an error tolerance for the passthought 3D pattern based on the calculated variance between the training 3D pattern and the passthought 3D pattern. Further, the method includes storing the passthought 3D pattern and the passthought brainprint in a neural profile as a passthought for a secure area.

20 Claims, 7 Drawing Sheets

(56) References Cited

U.S. PATENT DOCUMENTS

| | | | | |
|---|---|---|---|---|
| 2009/0063866 | A1* | 3/2009 | Navratil | G06F 21/445 713/186 |
| 2014/0228701 | A1* | 8/2014 | Chizeck | G06F 21/6254 600/544 |
| 2014/0230018 | A1* | 8/2014 | Anantharaman | H04L 63/0861 726/4 |
| 2014/0282877 | A1* | 9/2014 | Mahaffey | H04W 12/08 726/3 |
| 2015/0035643 | A1* | 2/2015 | Kursun | H04W 12/065 340/5.52 |
| 2015/0189266 | A1* | 7/2015 | Zhou | G02B 26/0825 348/54 |
| 2015/0338917 | A1* | 11/2015 | Steiner | H04M 1/7253 345/156 |
| 2016/0132669 | A1* | 5/2016 | Gay | G06F 21/32 726/19 |
| 2016/0253675 | A1* | 9/2016 | Remillet | G06T 15/04 705/44 |
| 2016/0342782 | A1 | 11/2016 | Mullins et al. | |
| 2017/0039045 | A1* | 2/2017 | Abrahami | A61B 5/486 |
| 2017/0228526 | A1* | 8/2017 | Cudak | H04L 63/0861 |
| 2017/0346817 | A1* | 11/2017 | Gordon | G06K 9/00885 |
| 2018/0285540 | A1* | 10/2018 | Chen | H04L 63/0861 |

OTHER PUBLICATIONS

Yongtuo Zhang et al., Continuous Authentication Using Eye Movement Response of Implicit Visual Stimuli, Dec. 2017, ACM, vol. 1, Issue 4, pp. 1-22. (Year: 2017).*

Max T. Curran et al., Passthoughts Authentication with Low Cost EarEEG, Aug. 16-20, 2016, IEEE, pp. 1979-1982. (Year: 2016).*

Dennis Frank et al., Personalizable Neurological User Authentication Framework, Jan. 26-29, 2017, IEEE, pp. 1-5. (Year: 2017).*

Bryksin, G., "Best Tools for Building Augmented Reality Mobile Apps," Upwork, Hiring Headquarters, printed: Mar. 29, 2018, pp. 1-14. https://www.upwork.com/hiring/for-clients/building-augmented-reality-mobile-apps/.

Casson et al., "Wearable EEG: what is it, why is it needed and what does it entail?", 30th Annual International IEEE EMBS Conference, Aug. 2008, pp. 5867-5870, IEEE. https://spiral.imperial.ac.uk/bitstream/10044/1/5360/2/embc2008_weeg.pdf.

Chuang et al., "Passthoughts on the Go: Effect of Exercise on EEG Authentication (Extended Version)," Proceedings of the 38th Annual International Conference of the IEEE Engineering in Medicine and Biology Society (EMBC 2016), Aug. 2016, pp. 1-10. people.ischool.berkeley.edu/~chuang/pubs/CC2016-extended.pdf.

Chuang et al., "I Think, Therefore I Am: Usability and Security of Authentication Using Brainwaves," Workshop on Usable Security (USEC '13), Proceedings of the Seventeenth International Conference on Financial Cryptography and Data Security (FC '13), Apr. 2013, pp. 1-16. people.ischool.berkeley.edu/~chuang/pubs/usec13.pdf.

Chuang, J., "One-Step Two-Factor Authentication with Wearable Bio-Sensors," Workshop on Who are you?! Adventures in Authentication (WAY '14), 10th USENIX Symposium on Usable Privacy and Security (SOUPS '14), Jul. 2014, pp. 1-3. https://cups.cs.cmu.edu/soups/2014/workshops/papers/biosensors_chuang_6.pdf.

De Llosa, P., "The New Science: Changing Ourselves by Changing the Brain," Parabola, Nov. 16, 2015, pp. 1-9 https://parabola.org/2015/11/16/the-new-science-changing-ourselves-by-changing-the-brain-by-patty-de-llosa/.

Finn, E., "Brain activity pattern as unique as fingerprint," EarthSky Voices in Human World | Science Wire, Oct. 19, 2015, pp. 1-13. http://earthsky.org/human-world/brain-activity-pattern-as-unique-as-fingerprint.

Kraft, U., "Train Your Brain," Scientific American, Jun. 1, 2007, pp. 1-14. https://www.scientificamerican.com/article/train-your-brain-2007-06/?print=true.

Nykamp, D., "Double integral examples," Math Insight, printed: Mar. 29, 2018, pp. 1-5. http://mathinsight.org/double_integral_examples.

Schneider, F., "Something You Know, Have, or Are," Lecture, Cornell, CS 513 System Security, Lecture notes by Tom Roeder, printed: Jan. 3, 2018, pp. 1-7. https://www.cs.cornell.edu/courses/cs513/2005fa/NNLauthPeople.html.

Waltz, E., "From Passwords to Passthoughts: Logging In to Your Devices With Your Mind," IEEE Spectrum, Aug. 31, 2016, pp. 1-3. https://spectrum.ieee.org/the-human-os/biomedical/devices/logging-into-your-devices-with-your-mind.

"Multi-factor authentication," Wikipedia, printed: Jan. 3, 2018, pp. 1-8. https://en.wikipedia.org/wiki/Multi-factor_authentication.

"Neeuro SenzeBand EEG Headset," mindtec Store, printed: Mar. 29, 2018, pp. 1-4. https://www.mindtecstore.com/Neeuro-SenzeBand-EEG-Headset_1.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

PASSTHOUGHT FOR MULTIFACTOR AUTHENTICATION IN AUGMENTED REALITY

BACKGROUND

The present disclosure relates to multifactor authentication and, more specifically, to two-factor authentication of a passthought in an augmented reality program.

Augmented reality programs include user interfaces that display a live view of a user's surroundings combined with computer-generated information. Brain-computer interface (BCI) systems can be trained to recognize signals from electrical activity in the brain associated with specific thoughts, and translate these signals into actions (e.g., selecting items in the user interface, scrolling, typing, drawing patterns, etc.) in the augmented reality program. A passthought is a thought that can be used as an authentication factor in a BCI system for logging into a secure area (e.g., a webpage or a file). BCI systems use electroencephalogram (EEG) sensing devices to detect the signals, which are referred to as neural oscillations or brainwaves. Individual brains produce unique brainwave pattern data.

SUMMARY

Various embodiments are directed to a method for two-factor authentication. The method can include receiving a passthought brainprint and a training 3D pattern. The method can also include calculating a variance between the training 3D pattern and a passthought 3D pattern, and generating an error tolerance for the passthought 3D pattern based on the variance between the training 3D pattern and the passthought 3D pattern. The variance between the training 3D pattern and the passthought 3D pattern can be a difference in volume between an area defined by the training 3D pattern and an area defined by the passthought 3D pattern. Further, the method can include storing the passthought 3D pattern and the passthought brainprint in a neural profile as a passthought for a secure area.

The method can also include receiving a login attempt brainprint and a login attempt 3D pattern. Additionally, the method can include calculating a 3D pattern error for the login attempt 3D pattern, and calculating a brainprint error for a login attempt brainprint. The method can also include determining whether the brainprint error is below a brainprint error threshold value, and determining whether the 3D pattern error is below a 3D pattern error threshold.

Additionally, the method can include allowing access to the secure area when the brainprint error is below the brainprint error threshold value and the 3D pattern error is below the 3D pattern error threshold value. The method can also include denying access to the secure area when the similarity is not below the brainprint error threshold value, and denying access to the secure area when the variance between the login attempt 3D pattern and the passthought 3D pattern is not below the threshold 3D pattern error threshold value.

DETAILED DESCRIPTION

Figure 1:
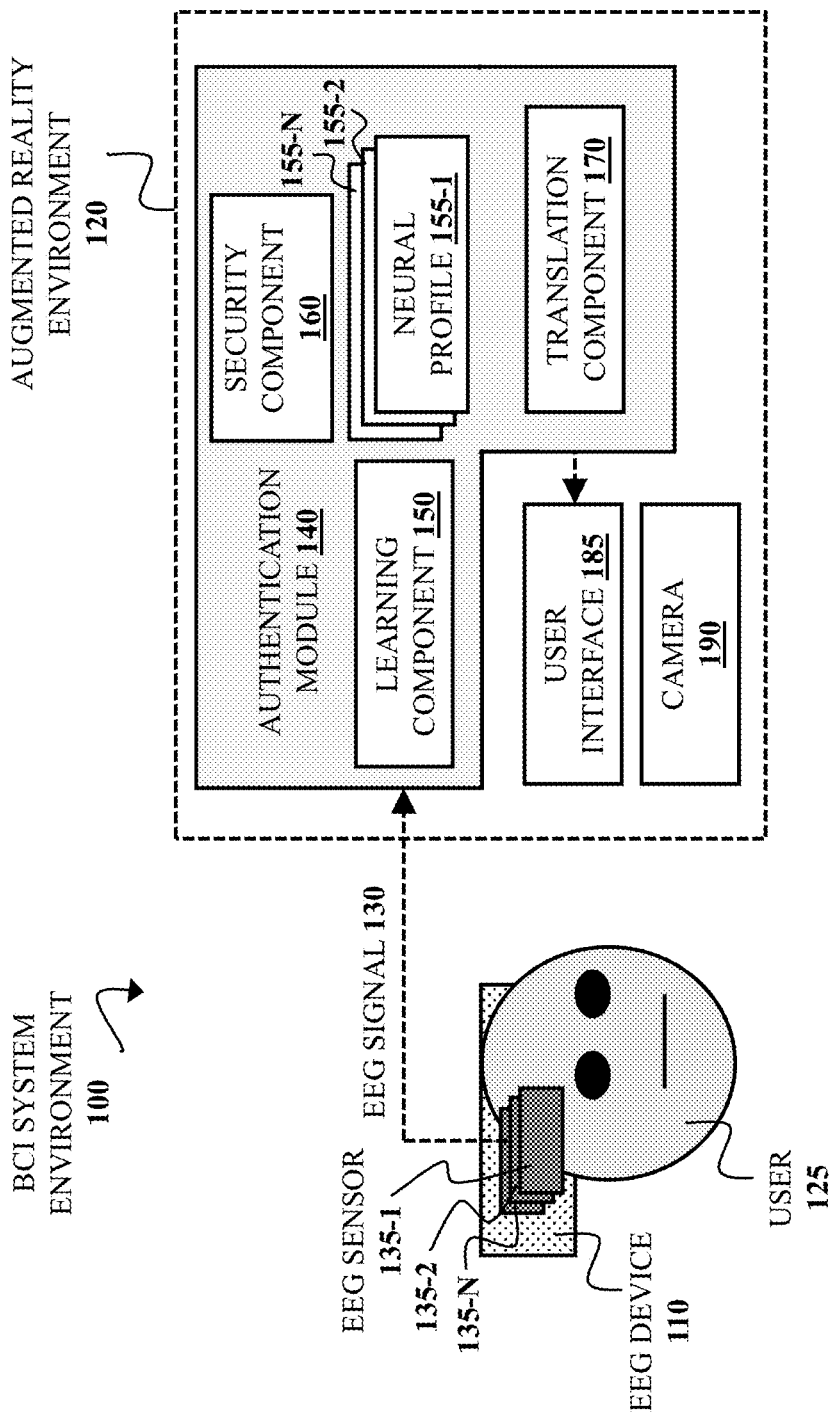
FIG. 1 is a block diagram illustrating an BCI system environment.

Augmented reality programs include user interfaces displaying live views of a user's surroundings combined with computer-generated information (e.g., graphical images, sounds, haptics, scents, somatosensory stimulation, etc.). For example, these programs may generate and display text and/or graphical images based on photographic images or audio data from the user's surroundings. The programs may also provide audio data based on photographic images and/or text data from the user's surroundings. Additionally, augmented reality program interfaces may display websites, files, and software interfaces.

Examples of applications for augmented reality may include video games, advertising displays, procedural guides (e.g., for medical procedures, manufacturing, mechanical repair, etc.), navigation systems, etc. Additional examples can include programs that display supplemental information related to the user's surroundings, such as language translations, map directions, the title and author of a song being played near the user, opera lyrics, weather information, and scores at a sporting event. Supplemental information can also be presented as audio information in some examples. Further, augmented reality programs can be used as aids for people with various disabilities (e.g., by providing live subtitles and/or captions, live audio descriptions, supplemental information about items that are out of reach, guidance for accomplishing tasks, etc.).

A brain-computer interface (BCI) system is trained to recognize electrical signals produced by the brain, which are referred to as neural oscillations or brainwaves. The BCI system then translates the signals into actions carried out in a computer program. Examples of these actions include interactions with a user interface, such as a user interface in an BCI system environment. For example, brainwaves generated by specific thoughts can be associated with instructions for selecting characters on a virtual keyboard, scrolling, writing, selecting icons, and drawing two-dimensional (2D) or three-dimensional (3D) patterns. Further, BCI systems can be used by people with disabilities (e.g., mobility challenges, fine motor skill impairments, and/or communication disorders) to accomplish computer tasks without employing physical actions or speech.

BCI systems typically use electroencephalogram (EEG) devices, which include electrodes for sensing brainwaves. Every brain produces unique brainwave pattern data. Further, brainwave pattern data varies according to an individual's mental state (e.g., surprised, happy, tired, asleep, anxious, etc.), activity (e.g., meditating, exercising, playing a musical instrument, solving a math problem, etc.), and other specific thoughts (e.g., mental images, visualized gestures, words, melodies, etc.). The brainwave pattern data produced by a person wearing an EEG device is used to interact with a computer using a BCI system.

BCI systems can use brainwave patterns generated by specific thoughts as login authentication factors. These are referred to as passthoughts. For example, a user wearing an EEG device may log into a program by thinking of a particular word. A significant portion of websites, software, and other computer programs require users to log in before accessing secure areas, such as websites with financial or health information, email and social media accounts, and confidential files. Further, multifactor authentication is becoming increasingly common for enhanced security. Multifactor authentication requires a user to submit more than one separate piece of evidence (authentication factor) in a login attempt. The different types of authentication factors can be summarized as something you know (e.g., a password or an answer to a security question), something you have (e.g., a photo ID or an access code generated by a mobile application), and something you "are". This is something that is unique to a particular person, such as a fingerprint or retinal scan.

However, multifactor authentication can be impractical for people who rely on BCI systems. For example, a person who is unable to type and/or speak would not be able to use most of the common multifactor authentication techniques (e.g., entering a password and an emailed access code) without assistance. Therefore, there is a need for simple and secure multifactor authentication that can be controlled entirely through BCI systems. A passthought having two authentication factors is disclosed herein. One factor of the passthought is a 3D pattern known to a user, which the user can enter by producing brainwave pattern data with instructions for rendering the 3D pattern on a user interface. The other factor is a brainwave pattern data signature. EEG signals include brainwave pattern data signatures that are unique to each individual. The uniqueness of these signatures is analogous to that of fingerprints. Therefore, the brainwave pattern data signatures are referred to herein as "brainprints". A user having an authenticated brainprint can log into a program upon entering a 3D pattern matching the passthought 3D pattern.

FIG. 1 is a block diagram illustrating an BCI system environment 100. The BCI system environment 100 includes an EEG device 110 and an augmented reality environment 120. A user 125 communicates with the augmented reality environment 120 through an EEG signal 130 generated by brainwaves detected by at least one EEG sensor 135-1, 135-2, 135-N (collectively 135) in the EEG device 110. The augmented reality environment 120 includes an authentication module 140. The authentication module 140 includes a learning component 150, one or more neural profiles 155-1, 155-2, 155-N (collectively 155), a security component 160, and a translation component 170. Additionally, the augmented reality environment 120 includes a user interface 185 and a camera 190.

The EEG device 110 and sensor 135 allow a user 125 to communicate with the augmented reality environment 120. Herein, "user" 125 refers to any individual in communication with the augmented reality environment 120 through the EEG device 110. The EEG device 110 is illustrated as a white box connected to the EEG sensor or sensors 135, which are represented by dark gray boxes. However, it should be noted that these boxes are not intended to represent the actual appearance and/or arrangement of the EEG device 110 and sensor 135. Further, the EEG device 110 can include components that are not illustrated in FIG. 1 (e.g., a headset, a microphone, headphones, a display screen, etc.). In some embodiments, the EEG device 110 can be a stand-alone device, or it can be part of a device with multiple functions in addition to brainwave detection and transmission (e.g., an augmented reality headset). The EEG device 110 may also be attached to an article of clothing or accessory worn by the user 125 (e.g., a pair of sunglasses, a set of headphones, a hat, a headband, or a hood) or a mobility aid (e.g., a wheelchair or mobility scooter).

The EEG device 110 is worn or attached so that each EEG sensor 135 maintains sufficient contact with the user 125 to allow the detection of brainwaves by at least one electrode in the sensor 135. The EEG device 110 may have 15-30 sensors 135, though any number of sensors 135 can be attached (e.g., 1-300 sensors). Brainwave detection and electrodes are discussed in greater detail below. In some embodiments, the EEG device 110 is a head covering (e.g., a cap, net, or helmet) that has multiple EEG sensors 135 placed at different locations on the user's 125 head. However, one or more EEG sensors 135 can also be attached to a user's 125 scalp without a cap, band, or headset. For example, sensors 135 can be pasted or taped to the scalp.

In some embodiments, the sensor 135 is in contact with the user's 125 scalp, forehead, and/or temples. For example, the EEG device 110 may include a headset having an EEG sensor 135 at the end of an adjustable arm that extends to touch the temple or forehead of the user 125. Headsets can also have more than one EEG sensor 135 arm in some embodiments. For example, there may be two EEG sensor 135 arms. In some instances, the EEG device 110 includes a band containing one or more EEG sensors 135 that extends across the user's 125 forehead or wraps around the user's 125 head. EEG sensors 135 can also detect brainwaves through contact with one or both of the user's 125 ears (e.g., by resting in the auditory canal and/or the concha). Further, the EEG sensor 135 may be implanted below the scalp (e.g., just below the skin or on the surface of the brain).

In some embodiments, the electrodes in the EEG sensor 135 are silver-silver chloride (Ag|AgCl) electrodes. However, other kinds of electrodes can be used, such as silver cup electrodes, tin cup electrodes, gold cup electrodes, platinum electrodes, and stainless steel electrodes. The contact between the electrodes and the skin can be dry. Dry contact refers to contact between the electrodes of the EEG sensor 135 and the user's 125 skin that is unmediated by an added conductive material (e.g., a gel). Dry skin-electrode contact is convenient, in that it does not require the application of additional materials. However, conductive gels, conductive pastes, and electrolyte solution-soaked pads can also be used to facilitate the electrodes' signal 130 detection in some embodiments. In some instances, these materials include an adhesive.

The brainwaves detected by the EEG sensor 135 include gamma ($\gamma$) waves (approximately 30 Hz-approximately 100 Hz) and beta ($\beta$) waves (approximately 12 Hz to approximately 30 Hz). Brainwaves of other frequencies within the detection bandwidth of the EEG sensor 135 can be detected as well. In some embodiments, the EEG sensor 135 has a detection bandwidth of 0 Hz-3500 Hz. However, any bandwidth that includes $\gamma$ and $\beta$ brainwave frequencies can be used, such as approximately 0.5 Hz-100 Hz or approximately 0.5 Hz-200 Hz. One or more channels are used for detection. Each channel includes two electrodes, which include two active electrodes, or one active and one reference electrode. The number of channels depends on the desired specifications of the device 110 (e.g., size, cost, and design), the number of EEG sensors 135, the size of the user 125, etc. In some embodiments, the EEG sensor 135 uses a single channel for detection. However, multiple channels (e.g., 16-256 channels) are used in some embodiments, and any appropriate number of channels can be used (e.g., 7, 16, 32, 64, 128, 256, 272, or 500 channels).

The EEG device 110 converts the detected brainwaves into the EEG signal 130, and transmits the EEG signal 130 to the augmented reality environment 120. The EEG device 110 can transmit the EEG signal 130 through a wired connection (e.g., copper wire or optical fiber) or a wireless connection (e.g., Wi-Fi or Bluetooth). In some embodiments, the EEG device 110 includes both wired and wireless EEG signal 130 transmission options. The augmented reality environment 120 can be part of a mobile computing device (e.g., a smartphone or a tablet computer) or a wearable computing device (e.g., an augmented reality headset or a pair of smart glasses). Additional examples of devices that can be used include desktop computers and laptop computers.

Further, in some embodiments, the augmented reality environment 120 includes more than one device. For example, the authentication module 140 may be in a smartphone, while the user interface 185 and camera 190 are in a pair of smartglasses. It should also be noted that the EEG device 110 may include both the EEG sensors 135 and at least one component of the augmented reality environment 120 in some embodiments. For example, a headset EEG device 110 may include the authentication module 140 and the EEG sensors 135. This headset may be in communication (e.g., through wires, Bluetooth, Wi-Fi, etc.) with a device that includes the user interface 185, and optionally the camera 190. The camera 190 is discussed in greater detail below.

The EEG signal 130 is received by the authentication module 140, which includes a learning component 150, at least one neural profile 155, and a security component 160. Components of the authentication module 140 use a variety of techniques for analyzing an EEG signal 130. The techniques used depend on the information being gathered, the desired accuracy level, the type of EEG sensor 135 and software, etc. This is discussed in greater detail below. Examples of techniques that may be used include Nonnegative Matrix Factorization (NMF), semi-supervised NMF, kernel NMF, Normalized Compression Distance (NCD), Lempel-Ziv (LZ) complexity measurement, curve fitting (CF), generative models based on kernel assumptions, Common Tensor Discriminant Analysis (CTDA) method using massive parallelism, empirical mode decomposition (EMD) with LZ complexity measurement, CF for Short Time Series (STS) biological data. However, any appropriate technique for analyzing brainwaves through EEG data can be used, such as semi-supervised and/or unsupervised machine learning algorithms, similarity and metric learning algorithms, hash algorithms, deep learning techniques, and neural networks.

The learning component 150 learns instructions that allow the user 125 to interact with the user interface 185, and stores these instructions in a neural profile 155 for the user 125. When the user 125 visualizes a gesture, such a hand gesture, an EEG signal 130 that has brainwave pattern data unique to the gesture is produced. Associations between the particular visualized gestures and instructions for interacting with the user interface 185 are stored in the neural profile 155. Examples of instructions include instructions for rendering movements on the user interface 185 (e.g., drawing lines to render a 3D pattern). Additional examples of instructions can include instructions for selecting areas or items on the interface 185, selecting characters on a keyboard, and moving a cursor. When the user 125 visualizes a gesture, the associated movement is rendered on the user interface 185 by the translation component 170. The translation component 170 is discussed in greater detail below.

Based on brainwave pattern data in the EEG signal 130 produced by the user 125, the learning component 150 generates a passthought for at least one secure area, and stores the passthought in the neural profile 155 for the user 125. The passthought includes two authentication factors: a 3D pattern and a brainprint. The learning component 150 stores a brainprint from an EEG signal 130 produced by the user 125 as the passthought brainprint. The 3D pattern authentication factor can be a 3D pattern designed by the user 125 or a 3D pattern chosen from preset patterns. The selected 3D pattern is referred to herein as a passthought 3D pattern.

The learning component 150 also calculates variances between 3D patterns entered by the user 125 and the passthought 3D pattern. The user 125 enters a 3D pattern by visualizing gestures that correspond to instructions for rendering the pattern on the user interface 185. The variance can be determined by techniques that use single variable calculus, double integral calculus, and volume calculations. This is discussed in greater detail with respect to FIGS. 3 and 4. However, any appropriate error measuring technique can be used, such as tree pruning, the generalized Hough transform, hash algorithms, modal matching, the alignment method, statistics, deformable templates, relaxation labeling, Fourier descriptors, wavelet transform, curvature scale space, and/or neural networks.

The learning component 150 determines an error tolerance for the passthought 3D pattern based on calculated variances between the passthought 3D pattern and at least one training 3D pattern. The training 3D pattern refers to a 3D pattern entered by the user 125 in an attempt to match the passthought 3D pattern during a training phase. The user 125 is prompted to enter the training 3D pattern at least once (e.g., three times, ten times, fifteen times, etc.) as a set of training data. The calculated variances provide an error tolerance for the passthought 3D pattern that is unique to the user 125. Greater variances between the training 3D patterns and the passthought 3D pattern results in a larger error tolerance. The error tolerance is used as a 3D pattern error threshold value for a 3D pattern entered in a login attempt. 3D pattern error threshold values are discussed in greater detail below.

The security component 160 encrypts brainwave pattern data received by the authentication module 140, and carries out passthought two-factor authentication processes when the user 125 attempts to log into a secure area with a passthought. Examples of secure areas can include application software, websites (e.g., banking sites, social networking sites, email service providers, healthcare sites, etc.), and files. In a two-factor authentication process, the security component 160 compares login attempt authentication factors with the stored passthought authentication factors. In order to determine a brainprint error, the security component 160 determines the similarity of a login attempt brainprint to the passthought brainprint. For example, if a login attempt brainprint is 96% identical to the passthought brainprint, the brainprint error would be 4%. Examples of techniques for analyzing the brainprint data include tree pruning, the generalized Hough transform, hash algorithms, modal matching, the alignment method, statistics, deformable templates, relaxation labeling, Fourier descriptors, wavelet transform, curvature scale space, and/or neural networks. The 3D pattern error is calculated in the same way as a 3D pattern variance. This is discussed in greater detail below.

The security component 160 allows access to a secure area when the user 125 enters a login attempt having both a 3D pattern error value and a brainprint error value that are below a brainprint error threshold value and a 3D pattern error threshold value, respectively. The error threshold values represent maximum acceptable differences between the login attempt authentication factors and the passthought authentication factors. The error threshold values can be adjusted in some embodiments. For example, the error threshold values may be adjusted by the user 125 or another individual, such as an administrator for the passthought-protected system. However, in other embodiments, the thresholds cannot be adjusted. If there are multiple neural profiles 155, each assigned to a different individual with access to the BCI system environment 100, the individual neural profiles 155 may have the same error threshold values or, or they may have different values corresponding to different access levels.

The translation component 170 translates brainwave pattern data in the EEG signals 130 received by the authentication module 140 into actions rendered on the user interface 185. The translation component 170 receives brainwave pattern data associated with gestures visualized by the user 125, and translates the brainwave pattern data into its corresponding instructions. Based on the instructions, actions are rendered on the user interface 185. For example, a left-handed gesture (e.g., pointing, making a fist, waving, etc.) may correspond to instructions for drawing a line from right to left on the user interface 185. When the user 125 visualizes the left-handed gesture, the translation component 170 renders a line drawn from right to left on the user interface 185. In the augmented reality environment 120, this line may be superimposed on a live view of the user's 125 surroundings captured by the camera 190. For example, the translation component 170 may render lines forming a box around an object in the live view when the user 125 enters instructions for rendering the lines. The 3D pattern drawing can also be superimposed over a computer-generated 3D graphical image (e.g., a box, a sphere, an organic shape, a grid, etc.) on the user interface 185.

Various types of camera 190 can be used to provide a live view on the user interface 185. For example, the camera 190 can be a mobile phone camera, a camera built into a laptop or an augmented reality headset, or an external camera in communication with a device that includes the user interface 185 (e.g., a camera attachment for an augmented reality headset). The user interface 185 is a user interface for an augmented reality platform that can display a 3D pattern based on instructions translated from brainwave pattern data. The user interface 185 displays a login screen when the user 125 attempts to enter a secure area, and can prompt the user 125 to enter a passthought. This is discussed in greater detail with respect to FIG. 2.

In some embodiments, the user interface 185 can display a user ID input field when the user 125 attempts to access a secure area. The user ID can include letters, numbers, and/or other characters entered into a text field. For example, the user ID can be a name or birthday. The user ID can also be an image (e.g., a computer graphic or a photographic image) or a shape selected by the user. In some embodiments, the user 125 selects an icon or enters text on a graphical representation of a keyboard displayed on the user interface 185. The user ID input can be carried out with the EEG device 110 by visualizing gestures associated with selection or typing. However, the user 125 may also enter the ID manually (e.g., with a touchscreen, keyboard, or mouse). In some embodiments, the user 125 can be identified using facial recognition or another biometric measurement (e.g., measurement of a retina pattern, an iris pattern, a voice pattern, a palm print, a vain match, etc.). In other embodiments, no user ID is required at the login screen.

Figure 2:
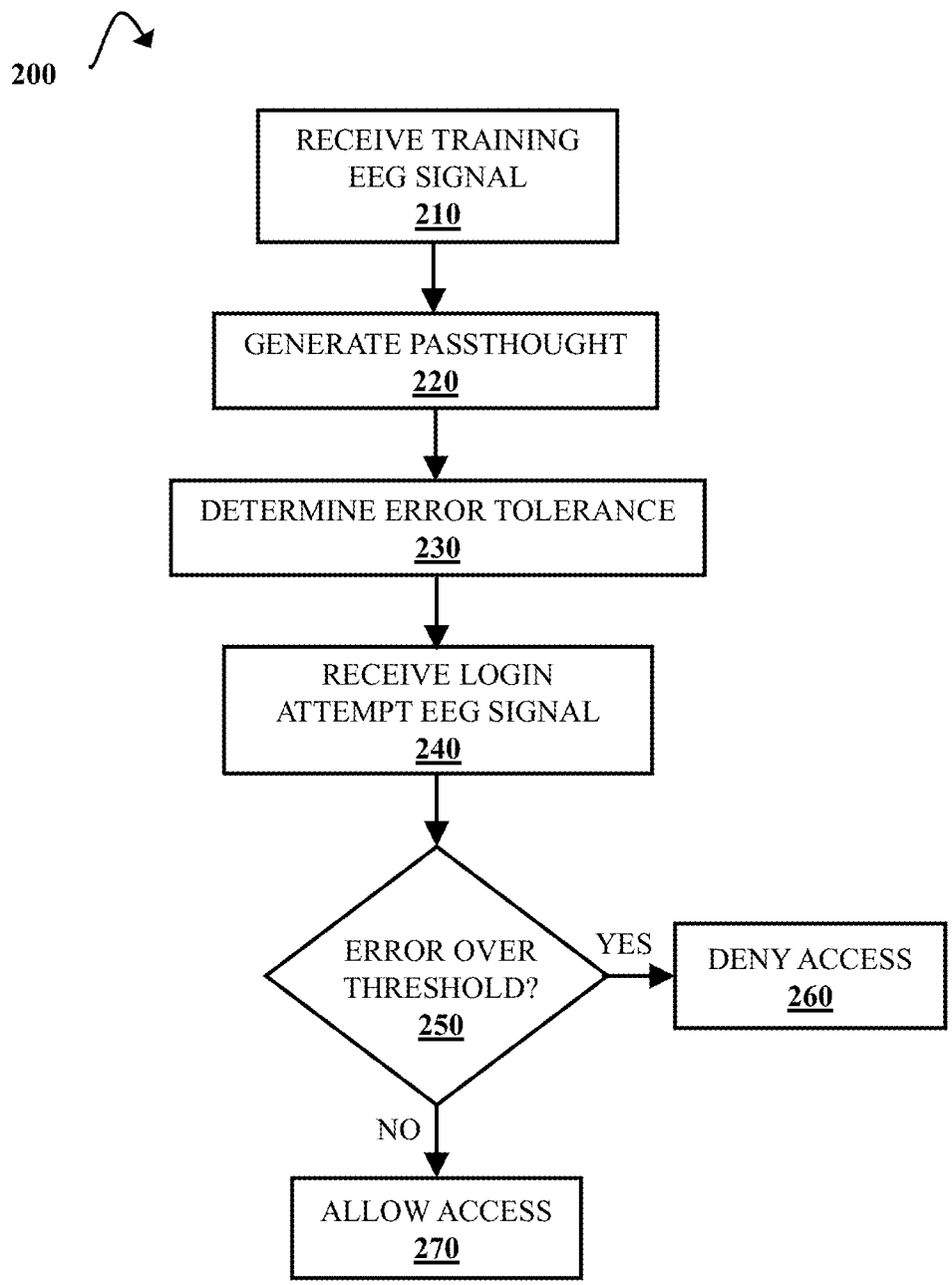
FIG. 2 is a flow diagram illustrating a process of two-factor authentication.

FIG. 2 is a flow diagram illustrating a process of two-factor authentication. To illustrate process 200, but not to limit embodiments, FIG. 2 is described within the context of the BCI system environment 100 of FIG. 1. Process 200 begins when a training EEG signal is received by the authentication module 140 in a training phase. This is illustrated at step 210. The training EEG signal refers to the EEG signal 130 produced by the user 125 in contact with the EEG sensor 135 during a training phase. In the training phase, the user 125 is prompted to visualize specific gestures. When the user 125 visualizes a gesture, an EEG signal having unique brainwave pattern data is generated. The learning component 150 stores associations between the unique brainwave pattern data for the visualized gestures and instructions associated with each gesture. Then, when the user 125 visualizes one of these gestures in the future, the translation component 170 translates the associated instruction into an action rendered on the user interface 185.

A passthought having two authentication factors is generated. This is illustrated at step 220. The two authentication factors are a passthought brainprint and a passthought 3D pattern. The passthought brainprint is gathered from the training EEG signal 130 entered by the user 125, and is then saved in the neural profile 155. The passthought 3D pattern is selected by the user 125, and saved to the neural profile 155 as well. Error threshold values for each of the authentication factors are also stored in the neural profile 155. The brainprint error threshold value is preset and/or adjusted by a user, and the 3D pattern error threshold value is an error tolerance.

An error tolerance is determined for the passthought 3D pattern based on variance calculations. This is illustrated at step 230. The error tolerance is a measure of acceptable variation between a login attempt 3D pattern and the passthought 3D pattern (e.g., a percent error or an error ratio), and is used as the 3D pattern error threshold value in subsequent steps. The error tolerance is based on at least one calculated variance between a user-input 3D pattern received in the training phase. Examples of variance calculations are discussed in greater detail with respect to FIGS. 3 and 4. User-input 3D patterns received in the training phase are referred to herein as training 3D patterns. The user 125 can be prompted to enter a training 3D pattern by a prompt displayed on the user interface 185. However, any type of prompt can be used, such as a sound. The variance between the training 3D pattern and the passthought 3D pattern is then calculated. The error threshold is calculated from multiple variances (e.g., the average of the variances calculated for five training 3D patterns) in some embodiments. However, a single variance can be the error threshold in other embodiments.

The level of error tolerance is unique to the user 125. For example, if the user 125 is able to consistently produce training 3D patterns with less than 10% variance, the 3D pattern error threshold value for the passthought 3D pattern may be 10%. If the user 125 were unable to produce training 3D patterns having variances lower than 25%, the threshold value may be 25%. However, in some embodiments, there is a security threshold value for the variance. The security threshold can be preset or entered by an administrator (e.g., the user 125 or another individual). If a calculated variance is over this threshold, the variance may not be saved as the error tolerance. The user 125 may then be prompted to enter the training 3D pattern again until one or more variances lower than the security threshold can be calculated. The error tolerance is then updated to include the variance or variances lower than the security threshold. However, the user 125 may also select an option to accept the error tolerance over the security threshold in some embodiments. It should also be noted that a preset error tolerance can be selected in some embodiments.

When the user 125 attempts to log into a secure area protected by a passthought, a login attempt EEG signal 130 is received by the authentication module 140. This is illustrated at step 240. The login attempt EEG signal 130 includes a login attempt brainprint. The user 125 enters a login attempt 3D pattern when a login screen is displayed on the user interface 185. The login screen displays an area on which the 3D pattern can be rendered. For example, the display area may include a series of dots, which the user 125 can connect with lines. The login screen may also include a grid or bounded 3D object that the user 125 can trace a pattern over. In some embodiments, the 3D object is an image of a real object in the user's surroundings, but the 3D object can also be a computer-generated graphic. In some embodiments, the screen does not include guiding shapes or patterns.

The login attempt brainprint and 3D pattern are then analyzed in a two-factor authentication process, wherein it is determined whether either of the login attempt authentication factors have errors above threshold values. This is illustrated at step 250. The security component 160 determines the difference between the login attempt authentication factors and the passthought authentication factors (e.g., by calculating percent similarity, variance, percent error, error ratio, etc.). Examples of techniques for determining differences are discussed in greater detail with respect to FIGS. 1, 3, and 4. The security component 160 then determines whether the login attempt brainprint or the login attempt 3D pattern have errors above their respective error threshold values. Error threshold values are discussed in greater detail with respect to FIG. 1.

If either of the login attempt authentication factors is over an error threshold value, the security component 160 denies access to the secure area protected by the passthought. This is illustrated at step 260. In some embodiments, the security component 160 allows at least one additional login attempt to be entered after an incorrect attempt. For example, a user 125 may be allowed to enter three incorrect login attempts before being locked out of the secure area. However, in other embodiments, the user 125 is locked out after a single incorrect login attempt. In some embodiments, the security component 160 does not include a lock-out option.

If both of the login attempt authentication factors are below their respective error threshold values, the security component 160 allows access to the secure area. This is illustrated at step 270. For example, the passthought error threshold values may be 10% 3D pattern error and 5% brainprint error. If so, a login attempt entered by the user 125 having a 3% 3D pattern error and a 4% brainprint error may be sufficient for accessing the secure area. However, a secure area may have additional authentication factors in some embodiments. Examples of additional authentication factors can include facial recognition, a spoken or typed password, at least one additional visualization (e.g., another 3D pattern, a 2D pattern, a word, a shape, an image, a melody, etc.), a brainprint from at least one additional individual, a tapped rhythm, a biometric measurement (e.g., a retina pattern, an iris pattern, a voice pattern, a palm print, a vain match, etc.), an implanted microchip, or a combination thereof.

Figure 3:
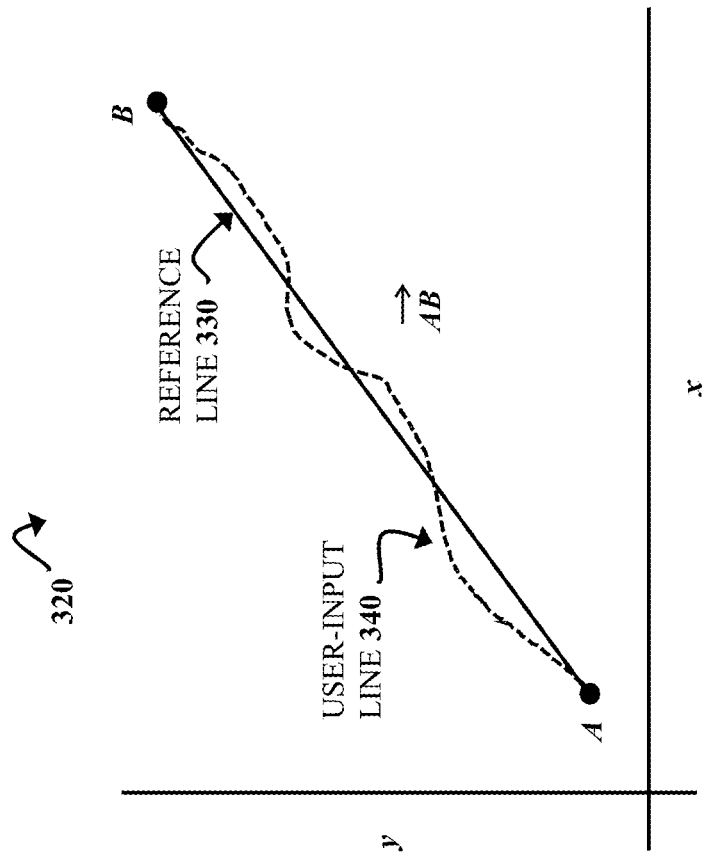
FIG. 3 is a schematic diagram illustrating a variance calculation for a first 3D pattern, according to some embodiments of the present disclosure.
Figure 3:
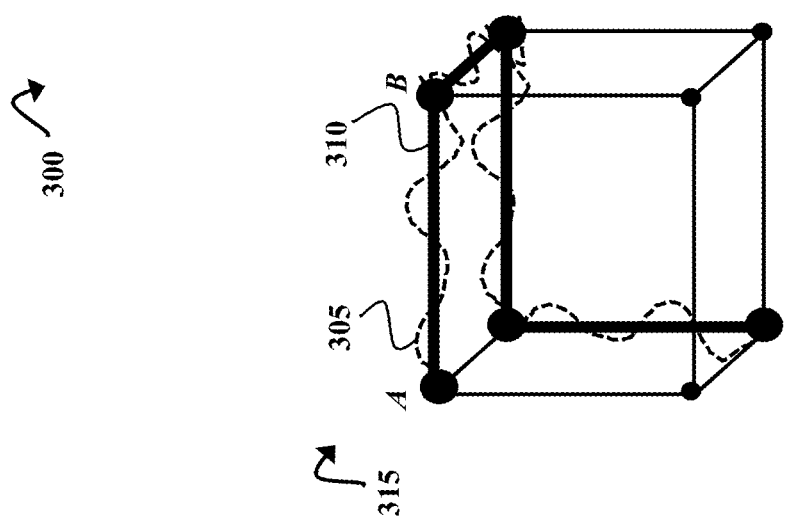

FIG. 3 is a schematic diagram 300 illustrating a variance calculation for a first 3D pattern, according to some embodiments of the present disclosure. The diagram 300 includes a user-input 3D pattern 305 (dashed line) and a passthought 3D pattern 310 (bolded line) superimposed on a box 315 and a 2D graph 320 illustrating a variance calculation for a portion of the passthought 3D pattern 310. The box 315 is an example of a graphical image that can be displayed on a login screen in the augmented reality environment 120. The user-input 3D pattern 305 can be a training 3D pattern or a login attempt 3D pattern. The variance between the passthought 3D pattern 310 and the user-input 3D pattern 305 is calculated. The variance includes measures of both 2D and 3D variance. This variance is used to calculate an error tolerance for the 3D pattern 310. Error tolerance calculations are discussed in greater detail with respect to FIG. 1.

The positions of box 315 corners A and B are included on the 2D graph 320. Corner A has coordinates (x, y), and corner B has coordinates (x+a$_1$, y+a$_2$). A vector $\overrightarrow{(AB)}$ for the line between corners A and B is plotted on the graph 320 as both a line 330 (bolded) from the passthought 3D pattern 310 and a line 340 (dashed) from the user-input 3D pattern. These lines are referred to herein as the passthought line 330 and the user-input line 340. In this example, the variance between the two lines 330 and 340 is calculated using single variable calculus, wherein the integral $\int_a bf(x)dx\int_b^a f(x)dx$ for positive $f(x)f(x)$ is interpreted as the area under the curve $f(x)f(x)$ over the interval [a, b] [a, b]. Each time the user-input line 340 crosses the passthought line 330, the differential is calculated as a percentage of available space. This calculation can be repeated for each line in the 3D pattern 310 in order to determine the entire 2D variance.

The 3D variance for the passthought 3D pattern 310 is determined by comparing the volume of the area defined by the passthought 3D pattern 310 and the volume of the area defined by the user-input pattern 305. The volume of the cuboid area defined by the passthought 3D pattern 310 is calculated by multiplying values for the length, width, and height of the cuboid area. In order to determine the volume of the area defined by the user-input 3D pattern 305, the area under the curve each time lines in the user-input 3D pattern 305 cross the passthought 3D pattern lines is calculated. Single variable calculus is again utilized to determine these positive (above the line) and negative (below the line) areas. The positive and negative areas are applied against the volume of the area defined by the passthought 3D pattern 310 to determine the volume of the area defined by the user-input 3D pattern 305. The 3D variance is the difference between the two volumes.

Figure 4:
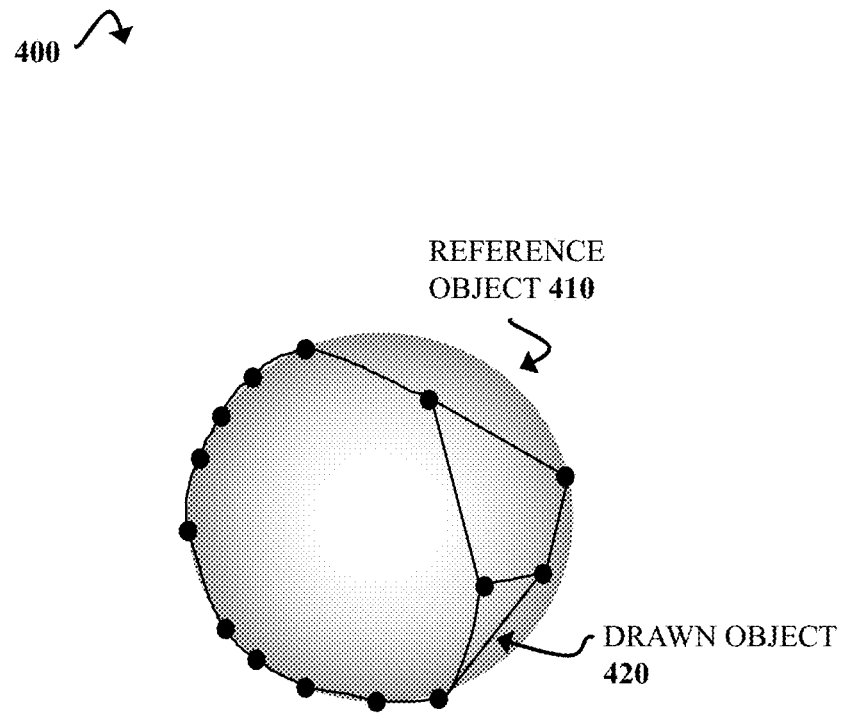
FIG. 4 is a schematic diagram illustrating a variance calculation for a second 3D pattern, according to some embodiments of the present disclosure.

FIG. 4 is a schematic diagram 400 illustrating a variance calculation for a second 3D pattern, according to some embodiments of the present disclosure. In this example, the passthought 3D pattern is a sphere, which is an example of a bounded 3D object that can be displayed on a login screen. This sphere is referred to herein as the reference object 410. The user 125 enters a 3D pattern (e.g., a training 3D pattern or a login attempt 3D pattern) by visualizing gestures associated with instructions for drawing a 3D object 420 using the reference object 410 as a template. This user-input 3D pattern is referred to herein as the drawn object 420.

The 3D variance for this 3D pattern is determined by calculating the difference in volume between the reference object 410 and the drawn object 420. The reference object 410 is a sphere, and its volume (V) can therefore be calculated using the equation $V=\frac{3}{4}\pi r^3$, where r is the radius of the sphere. The volume of the drawn object 410 is calculated as a double integral to determine the volume under the surface of the object 410 in three dimensions (x, y, and z). In this example, a double integral $\iint_D f(x, y)dA \iint_D f(x, y)dA$ for positive f(x, y)f(x, y) is used to calculate the volume under the surface z=f(x, y) z=f(x, y) of the drawn object 410. In order to calculate the volume under the surfaces of the other sides of the object 410, the double integral can be iterated (e.g., as $\int_c^d (\int_a^b f(x,y)dx)dy = \int_c^d \int_a^b f(x,y)dx\, dy$). This variance of the 3D pattern is the difference in the volume between the reference object 410 and the drawn object 420.

Figure 5:
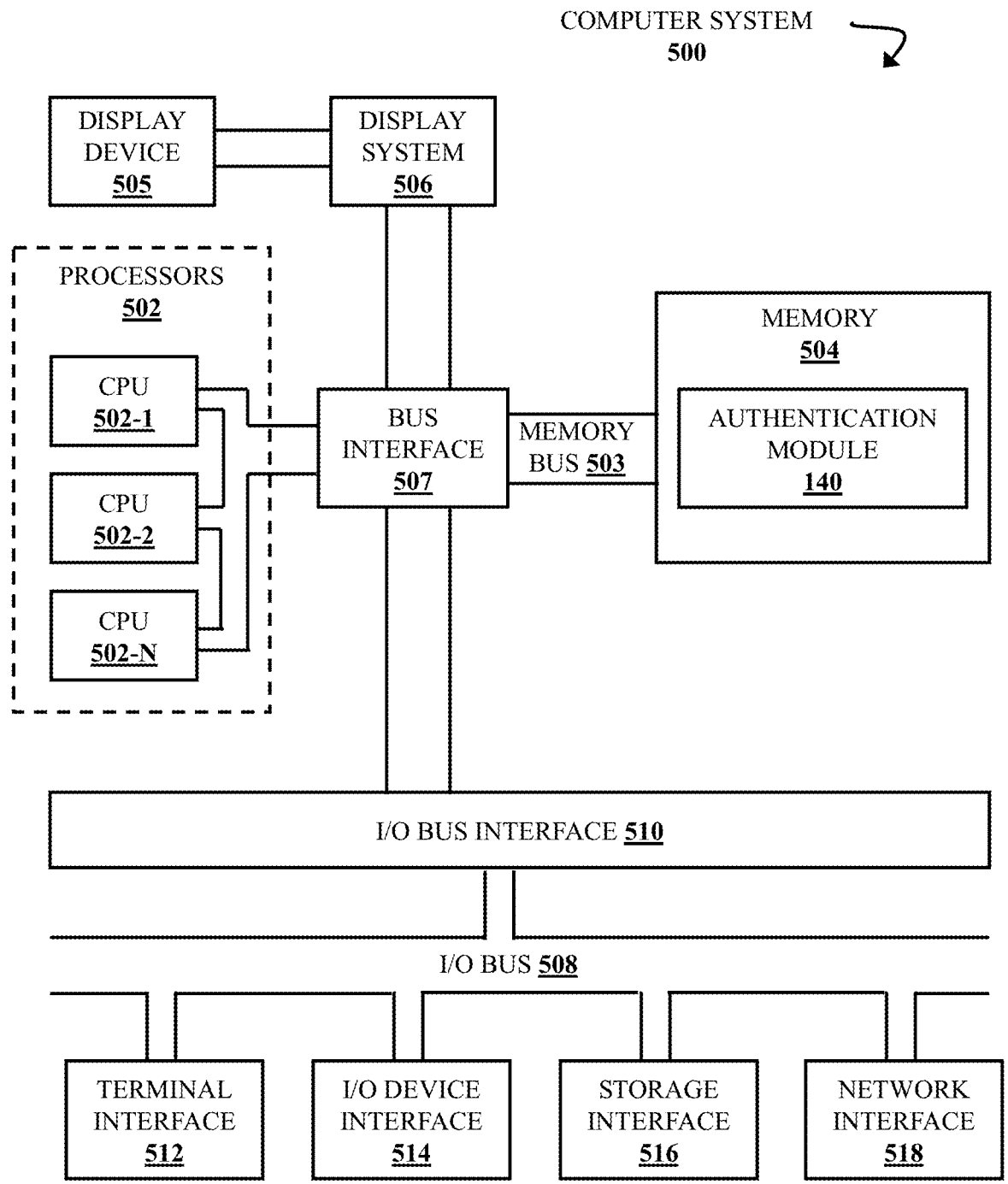
FIG. 5 illustrates a computer system, according to embodiments of the present disclosure.

FIG. 5 is a high-level block diagram illustrating an exemplary computer system 500 that can be used in implementing one or more of the methods, tools, components, and any related functions described herein (e.g., using one or more processor circuits or computer processors of the computer). In some embodiments, the major components of the computer system 500 comprise one or more processors 502, a memory subsystem 504, a terminal interface 512, a storage interface 516, an input/output device interface 514, and a network interface 518, all of which can be communicatively coupled, directly or indirectly, for inter-component communication via a memory bus 503, an input/output bus 508, bus interface unit 507, and an input/output bus interface unit 510.

The computer system 500 contains one or more general-purpose programmable central processing units (CPUs) 502-1, 502-2, and 502-N, herein collectively referred to as the CPU 502. In some embodiments, the computer system 500 contains multiple processors typical of a relatively large system; however, in other embodiments the computer system 500 can alternatively be a single CPU system. Each CPU 502 may execute instructions stored in the memory subsystem 510 and can include one or more levels of on-board cache.

The memory 504 can include a random-access semiconductor memory, storage device, or storage medium (either volatile or non-volatile) for storing or encoding data and programs. In some embodiments, the memory 504 represents the entire virtual memory of the computer system 500, and may also include the virtual memory of other computer systems coupled to the computer system 500 or connected via a network. The memory 504 is conceptually a single monolithic entity, but in other embodiments the memory 504 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures. The memory 504 also contains an authentication module 140, which includes a learning component 150, at least one neural profile 155, a security component 160, and a translation component 170.

These components are illustrated as being included within the memory 504 in the computer system 500. However, in other embodiments, some or all of these components may be on different computer systems and may be accessed remotely, e.g., via a network. The computer system 500 may use virtual addressing mechanisms that allow the programs of the computer system 500 to behave as if they only have access to a large, single storage entity instead of access to multiple, smaller storage entities. Thus, though the authentication module 140 is illustrated as being included within the memory 504, components of the memory 504 are not necessarily all completely contained in the same storage device at the same time. Further, although these components are illustrated as being separate entities, in other embodiments some of these components, portions of some of these components, or all of these components may be packaged together.

In an embodiment, the authentication module 140 includes instructions that execute on the processor 502 or instructions that are interpreted by instructions that execute on the processor 502 to carry out the functions as further described in this disclosure. In another embodiment, the authentication module is implemented in hardware via semiconductor devices, chips, logical gates, circuits, circuit cards, and/or other physical hardware devices in lieu of, or in addition to, a processor-based system. In another embodiment, the authentication module 140 includes data in addition to instructions.

Although the memory bus 503 is shown in FIG. 5 as a single bus structure providing a direct communication path among the CPUs 502, the memory subsystem 510, the display system 506, the bus interface 507, and the input/output bus interface 510, the memory bus 503 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 510 and the input/output bus 508 are shown as single respective units, the computer system 500 may, in some embodiments, contain multiple input/output bus interface units 510, multiple input/output buses 508, or both. Further, while multiple input/output interface units are shown, which separate the input/output bus 508 from various communications paths running to the various input/output devices, in other embodiments some or all of the input/output devices may be connected directly to one or more system input/output buses.

The computer system 500 may include a bus interface unit 507 to handle communications among the processor 502, the memory 504, a display system 506, and the input/output bus interface unit 510. The input/output bus interface unit 510 may be coupled with the input/output bus 508 for transferring data to and from the various input/output units. The input/output bus interface unit 510 communicates with multiple input/output interface units 512, 514, 516, and 518, which are also known as input/output processors (IOPs) or input/output adapters (IOAs), through the input/output bus 508. The display system 506 may include a display controller. The display controller may provide visual, audio, or both types of data to a display device 505. The display system 506 may be coupled with a display device 505, such as a standalone display screen, computer monitor, television, or a tablet or handheld device display. In alternate embodiments, one or more of the functions provided by the display system 506 may be on board a processor 502 integrated circuit. In addition, one or more of the functions provided by the bus interface unit 507 may be on board a processor 502 integrated circuit.

In some embodiments, the computer system 500 is a multi-user mainframe computer system, a single-user system, or a server computer or similar device that has little or no direct user interface, but receives requests from other computer systems (clients). Further, in some embodiments, the computer system 500 is implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 500. In some embodiments, however, individual components may have greater or lesser complexity than as represented in FIG. 5, Components other than or in addition to those shown in FIG. 5 may be present, and the number, type, and configuration of such components may vary.

In some embodiments, the data storage and retrieval processes described herein could be implemented in a cloud computing environment, which is described below with respect to FIGS. 6 and 7. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
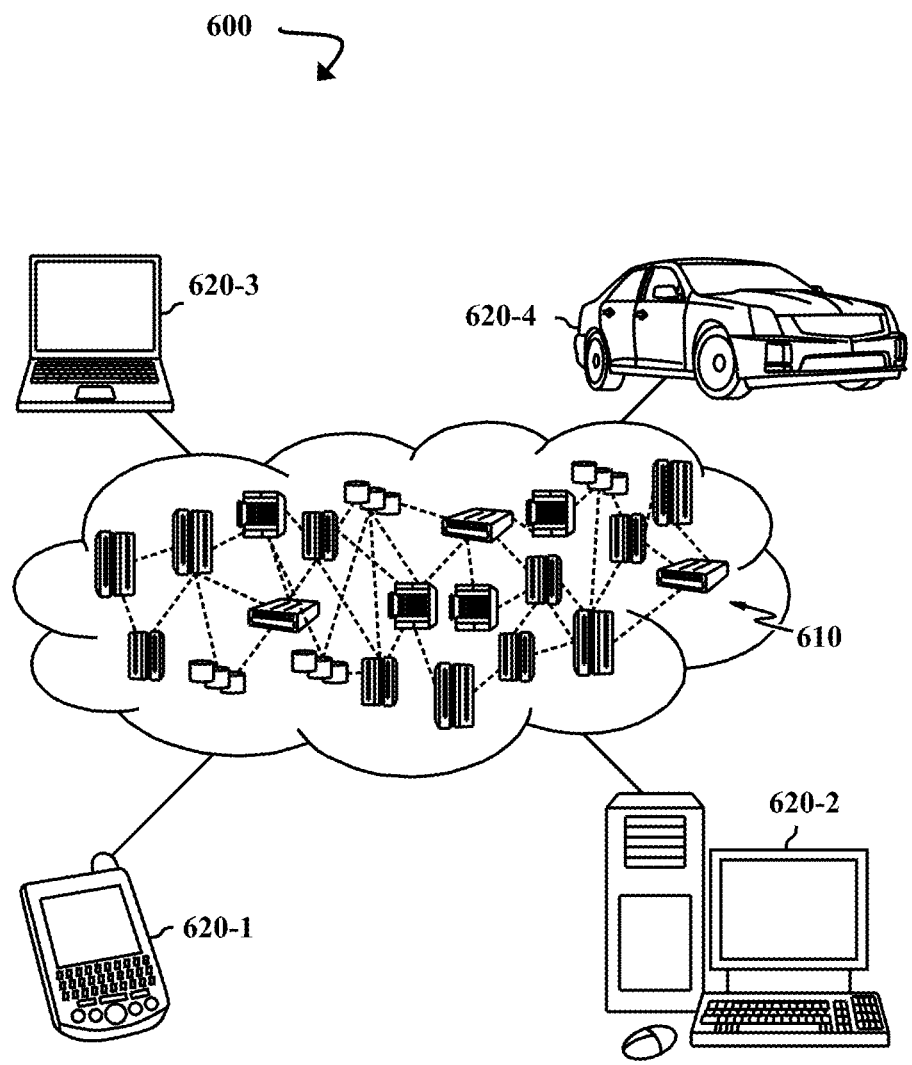
FIG. 6 is a block diagram illustrating a cloud computing environment, according to some embodiments of the present disclosure.

FIG. 6 is a block diagram illustrating a cloud computing environment 600, according to some embodiments of the present disclosure. As shown, cloud computing environment 600 includes one or more cloud computing nodes 610 with which local computing devices used by cloud consumers, such as, for example, personal digital assistant (PDA) or cellular telephone 620-1, desktop computer 620-2, laptop computer 620-3, and/or automobile computer system 620-4 may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 620-1-620-4 shown in FIG. 6 are intended to be illustrative only and that computing nodes 610 and cloud computing environment 600 can communicate with any type of computerized device over any type of network and/or network addressable connection (e.g., using a web browser).

Figure 7:
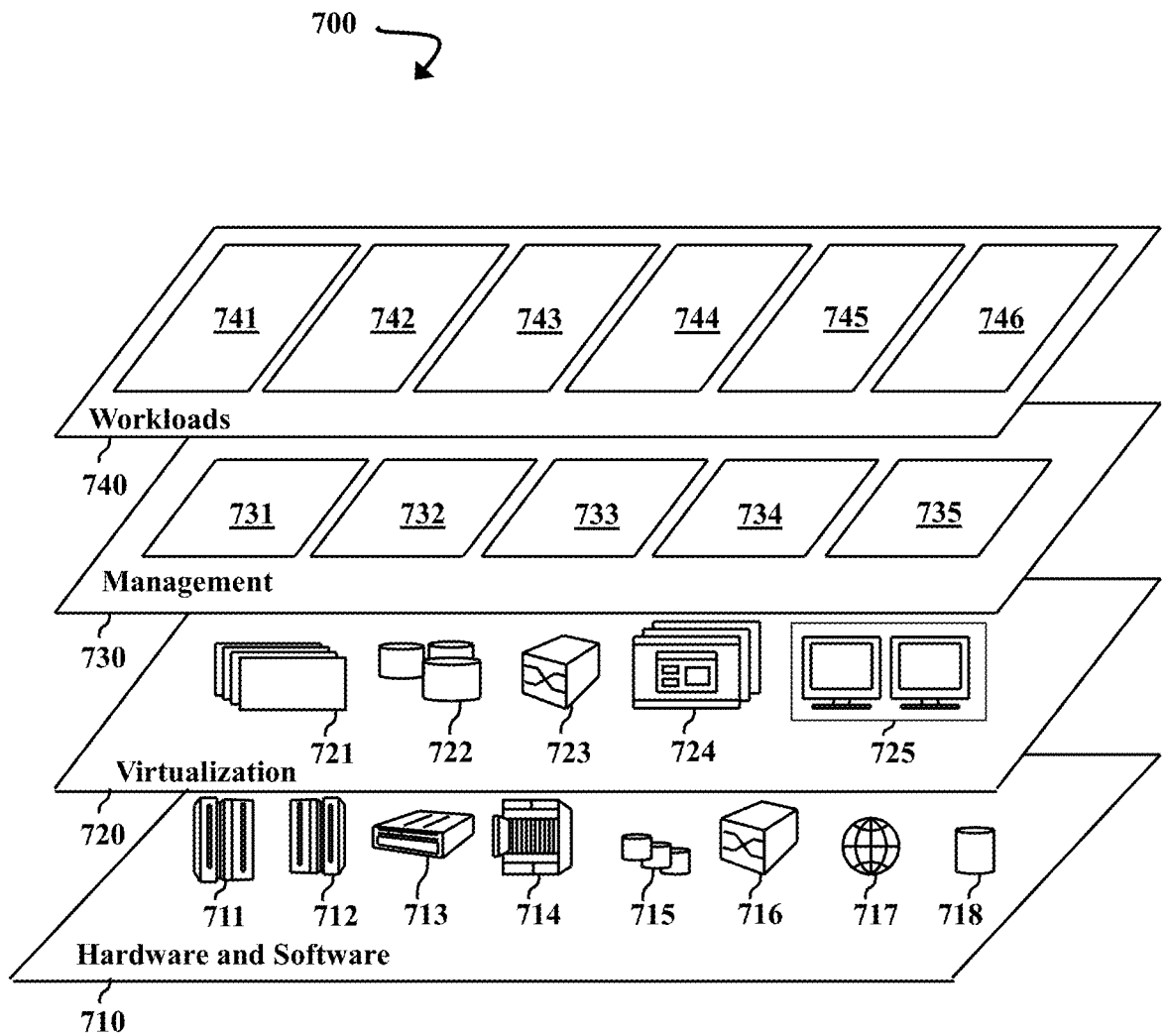
FIG. 7 is a block diagram illustrating a set of functional abstraction model layers provided by the cloud computing environment, according to some embodiments of the present disclosure.

FIG. 7 is a block diagram illustrating a set of functional abstraction model layers 700 provided by the cloud computing environment 600, according to some embodiments of the present disclosure. It should be understood in advance that the components, layers, and functions shown in FIG. 7 are intended to be illustrative only and embodiments of the invention are not limited thereto. As depicted, the following layers and corresponding functions are provided:

Hardware and software layer 710 includes hardware and software components. Examples of hardware components include: mainframes 711; RISC (Reduced Instruction Set Computer) architecture-based servers 712; servers 713; blade servers 714; storage devices 715; and networks and networking components 716. In some embodiments, software components include network application server software 717 and database software 718.

Virtualization layer 720 provides an abstraction layer from which the following examples of virtual entities may be provided: virtual servers 721; virtual storage 722; virtual networks 723, including virtual private networks; virtual applications and operating systems 724; and virtual clients 725.

In one example, management layer 730 provides the functions described below. Resource provisioning 731 provides dynamic procurement of computing resources and other resources that are utilized to perform tasks within the cloud computing environment. Metering and Pricing 732 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 733 provides access to the cloud computing environment for consumers and system administrators. Service level management 734 provides cloud computing resource allocation and management such that required service levels are met. Service Level Agreement (SLA) planning and fulfillment 735 provide pre-arrangement for, and procurement of, cloud computing resources for which a future requirement is anticipated in accordance with an SLA.

Workloads layer 740 provides examples of functionality for which the cloud computing environment can be utilized. Examples of workloads and functions that can be provided from this layer include: mapping and navigation 741; software development and lifecycle management 742; virtual classroom education delivery 743; data analytics processing 744; transaction processing 745; and generating a two-factor passthought that includes a 3D pattern and a brainprint 746.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out steps of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and step of possible implementations of systems, methods, and computer program products according to various embodiments of the present disclosure. In this regard, each block in the flowchart or block diagrams may represent a component, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out steps of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and step of possible implementations of systems, methods, and computer program products according to various embodiments of the present disclosure. In this regard, each block in the flowchart or block diagrams may represent a component, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for multifactor authentication, comprising:
receiving brainwave pattern data associated with a passthought brainprint from a user via an electroencephalogram (EEG) sensor in contact with the user;
receiving brainwave pattern data, generated when the user visualizes a first gesture, associated with instructions for rendering a training three-dimensional (3D) pattern from the user via the EEG sensor;
receiving brainwave pattern data, generated when the user visualizes a second gesture, associated with instructions for rendering a passthought 3D pattern from the user via the EEG sensor;
calculating a variance between the training 3D pattern and the passthought 3D pattern;
generating an error tolerance for the passthought 3D pattern based on the variance between the training 3D pattern and the passthought 3D pattern; and
storing the passthought 3D pattern and the passthought brainprint as a passthought for a secure area.

2. The method of claim 1, further comprising:
receiving brainwave pattern data associated with a login attempt brainprint;
receiving brainwave pattern data associated with instructions for rendering a login attempt 3D pattern;
calculating a 3D pattern error for the login attempt 3D pattern;
calculating a brainprint error for the login attempt brainprint;
determining whether the brainprint error is below a brainprint error threshold value; and
determining whether the 3D pattern error is below a 3D pattern error threshold value.

3. The method of claim 2, further comprising allowing access to the secure area when the brainprint error is below the brainprint error threshold value and the 3D pattern error is below the 3D pattern error threshold value.

4. The method of claim 2, further comprising denying access to the secure area when the brainprint error is not below the brainprint error threshold value.

5. The method of claim 2, further comprising denying access to the secure area when the 3D pattern error is not below the 3D pattern error threshold value.

6. The method of claim 1, further comprising:
determining that the variance between the training 3D pattern and the passthought 3D pattern is below a security threshold;
receiving brainwave pattern data associated with at least one additional training 3D pattern;
calculating a variance between the at least one additional training 3D pattern and the passthought 3D pattern; and
generating an updated error tolerance for the passthought 3D pattern based on the variance between the at least one additional training 3D pattern and the passthought 3D pattern.

7. The method of claim 1, wherein the variance between the training 3D pattern and the passthought 3D pattern is a difference in volume between an area defined by the training 3D pattern and an area defined by the passthought 3D pattern.

8. The method of claim 1, wherein the passthought brainprint comprises a brainwave pattern data signature that is unique to an individual.

9. The method of claim 1, wherein the determining the variance between the training 3D pattern and the passthought 3D pattern comprises:
 determining two-dimensional (2D) coordinates of positions on the training 3D pattern and corresponding positions on the passthought 3D pattern;
 determining, based on the 2D coordinates, a first vector for a line between two of the positions on the training 3D pattern and a second vector for a line between two of the corresponding positions on the passthought 3D pattern; and
 calculating a variance between the first vector and the second vector.

10. The method of claim 9, wherein the variance between the training 3D pattern and the passthought 3D pattern comprises:
 a difference in volume between an area defined by the training 3D pattern and an area defined by the passthought 3D pattern; and
 the variance between the first vector and the second vector.

11. A system for multifactor authentication, comprising:
 at least one processing component;
 at least one memory component;
 an augmented reality environment, the augmented reality environment comprising:
  a user interface;
  a camera; and
  an authentication module configured to receive electroencephalogram (EEG) signals, the authentication module comprising:
   at least one neural profile;
   a learning component configured to:
    receive brainwave pattern data associated with a passthought brainprint from a user via an EEG sensor in contact with the user;
    receive brainwave pattern data, generated when the user visualizes a first gesture, associated with instructions for rendering a training three-dimensional (3D) pattern from the user via the EEG sensor;
    receive brainwave pattern data, generated when the user visualizes a second gesture, associated with instructions for generating a passthought 3D pattern from the user via the EEG sensor;
    calculate a variance between the training 3D pattern and the passthought 3D pattern;
    generate an error tolerance for the passthought 3D pattern based on the variance between the training 3D pattern and the passthought 3D pattern; and
    store the passthought 3D pattern and the passthought brainprint in a neural profile from the at least one neural profile as a passthought protecting a secure area;
   a security component; and
   a translation component.

12. The system of claim 11, wherein the security component is configured to:
 receive brainwave pattern data associated with a login attempt brainprint;
 receive brainwave pattern data associated with instructions for rendering a login attempt 3D pattern;
 calculate a 3D pattern error for the login attempt 3D pattern;
 calculate a brainprint error for the login attempt brainprint;
 determine whether the brainprint error is below a brainprint error threshold value; and
 determine whether the 3D pattern error is below a 3D pattern error threshold value.

13. The system of claim 12, wherein the security component is further configured to deny access to the secure area when the brainprint error is not below the brainprint error threshold value.

14. The system of claim 11, wherein the EEG signals received by the authentication module are transmitted by an EEG device, the EEG device comprising at least one EEG sensor.

15. The system of claim 14, wherein the EEG device is an augmented reality headset.

16. The system of claim 11, wherein the user interface displays a login screen in an augmented reality program.

17. A computer program product for multifactor authentication, the computer program product comprising a computer readable storage medium having program instructions embodied therewith, the program instructions executable by a processor to cause a device to perform a method comprising:
 receiving brainwave pattern data associated with a passthought brainprint from a user via an electroencephalogram (EEG) sensor in contact with the user;
 receiving brainwave pattern data, generated when the user visualizes a first gesture, associated with instructions for rendering a training three-dimensional (3D) pattern from the user via the EEG sensor;
 receiving brainwave pattern data, generated when the user visualizes a second gesture, associated with instructions for rendering a passthought 3D pattern from the user via the EEG sensor;
 calculating a variance between the training 3D pattern and the passthought 3D pattern;
 generating an error tolerance for the passthought 3D pattern based on the variance between the training 3D pattern and the passthought 3D pattern; and
 storing the passthought 3D pattern and the passthought brainprint in a neural profile as a passthought protecting a secure area.

18. The computer program product of claim 17, further comprising:
 receiving brainwave pattern data associated with a login attempt brainprint;
 receiving brainwave pattern data associated with instructions for rendering a login attempt 3D pattern;
 calculating a 3D pattern error for the login attempt 3D pattern;
 calculating a brainprint error for the login attempt brainprint;
 determining whether the brainprint error is below a brainprint error threshold value; and
 determining whether the 3D pattern error is below a 3D pattern error threshold value.

19. The computer program product of claim 18, further comprising allowing access to the secure area when the brainprint error is below the brainprint error threshold value and the 3D pattern error is below the 3D pattern error threshold value.

20. The computer program product of claim 17, further comprising:

determining that the variance between the training 3D pattern and the passthought 3D pattern is below a security threshold;
receiving brainwave pattern data associated with instructions for rendering at least one additional training 3D pattern;
calculating a variance between the at least one additional training 3D pattern and the passthought 3D pattern; and
generating an updated error tolerance for the passthought 3D pattern based on the variance between the at least one additional training 3D pattern and the passthought 3D pattern.

* * * * *